W. A. LORENZ.
APPARATUS FOR FEEDING MOLTEN GLASS.
APPLICATION FILED AUG. 7, 1917.
1,300,181.
Patented Apr. 8, 1919.
2 SHEETS—SHEET 1.
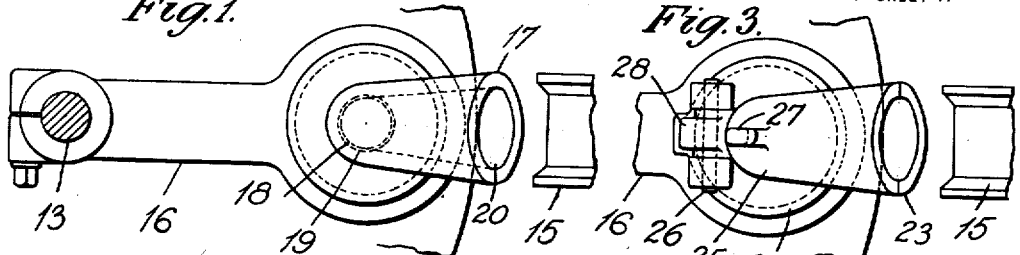
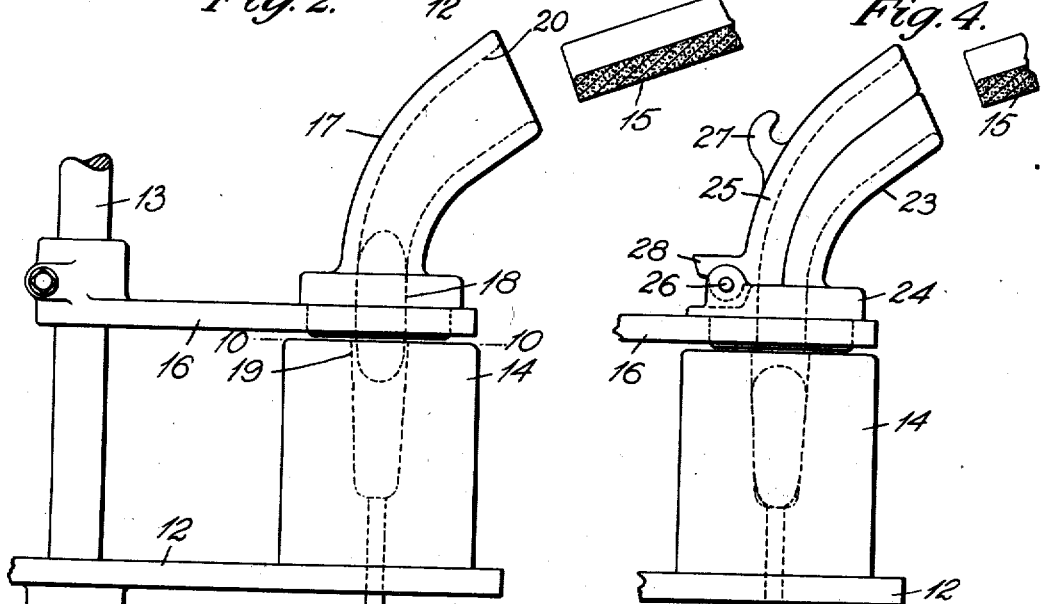
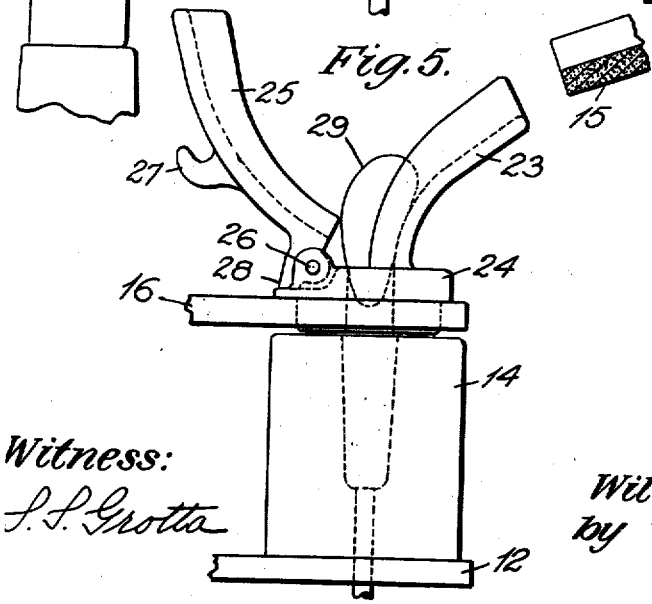
Witness:
J. S. Grotta
Inventor:
William A Lorenz
by W. H. Honiss
Att'y.

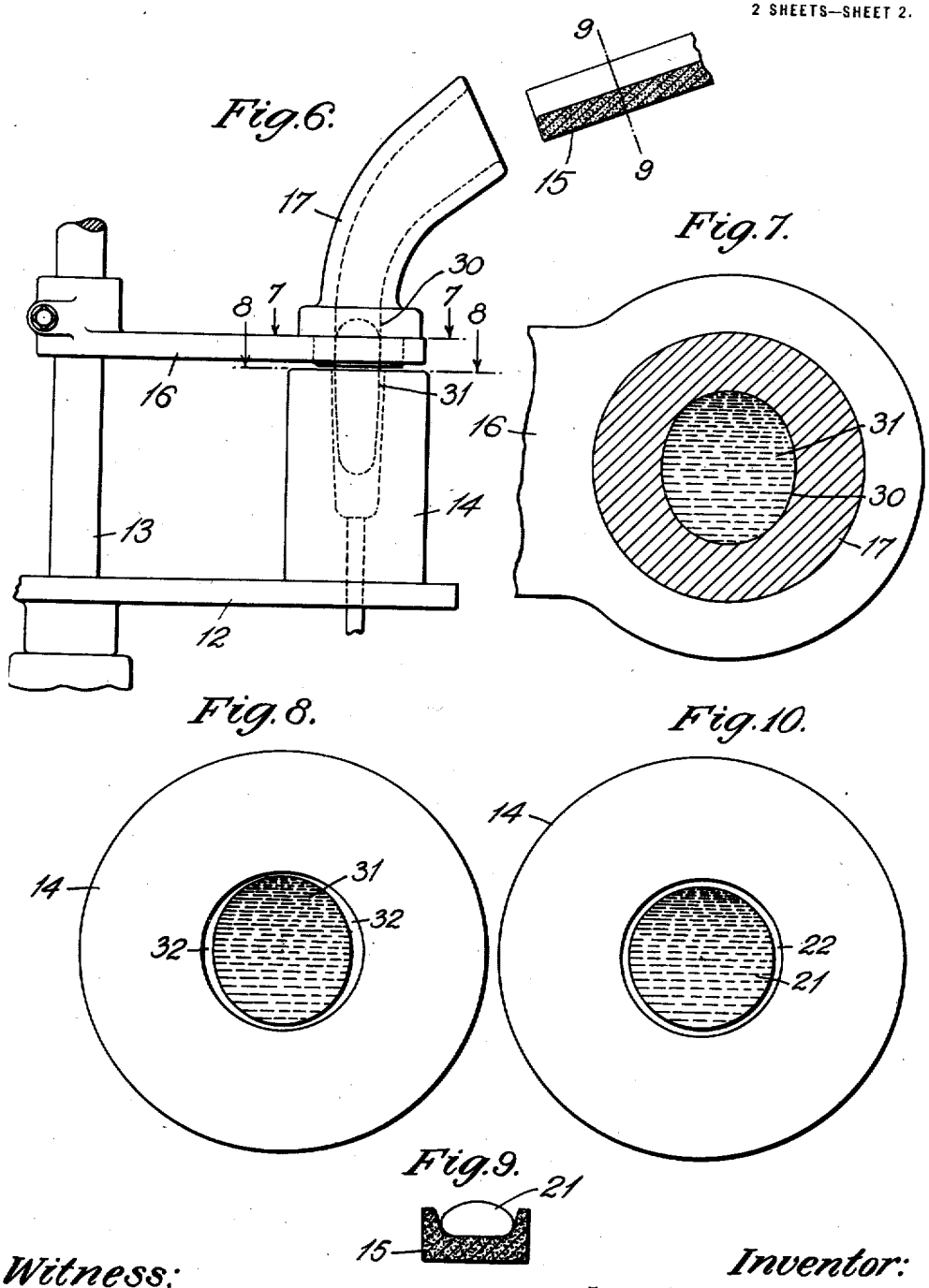

UNITED STATES PATENT OFFICE.

WILLIAM A. LORENZ, OF HARTFORD, CONNECTICUT, ASSIGNOR TO HARTFORD-FAIRMONT COMPANY, OF CANAJOHARIE, NEW YORK, A CORPORATION OF NEW YORK.

APPARATUS FOR FEEDING MOLTEN GLASS.

1,300,181.  Specification of Letters Patent.  Patented Apr. 8, 1919.

Application filed August 7, 1917. Serial No. 184,875.

*To all whom it may concern:*

Be it known that I, WILLIAM A. LORENZ, a citizen of the United States, residing at Hartford, in the county of Hartford and State of Connecticut, have invented new and useful Improvements in Apparatus for Feeding Molten Glass, of which the following is a specification.

This invention relates to means employed for delivering to pressing or blowing molds charges of molten glass which are gathered and separated from a molten supply in a furnace or other container.

It has been customary to discharge the gathers of glass directly from a spout or cup or conduit into the molds. These gathers of glass assume various contours, while forming into a gather, or while passing to the molds, so that when projected into the molds they are not regular or uniform in shape, which affects the uniform distribution of the glass in the molds when pressed or blown and they are liable to fill the mouths of the molds and prevent the outflow of air, which confined air becomes occluded and forms bubbles and other imperfections in the finished product.

The object of this invention is to provide means above the mouths of the molds which will impart to the gathers of glass such shape, and deposit them in the molds in such manner, that air will not be liable to be imprisoned, and the glass will be more uniformly distributed in the molds.

This object is attained by passing the molten glass gathers through a curved funnel, which has an enlarged entrance opening for receiving the glass gathers and has a reduced discharge opening which delivers the gathers in such shape and of such size that they quickly drop in elongated masses of practically uniform cross section to the bottoms of the molds.

In the accompanying drawings Figure 1 shows a plan view of a solid funnel and its support. Fig. 2 shows a side elevation of the solid funnel and its support and a mold on its table. Fig. 3 shows a plan view of a funnel that is made in separable sections so that it may be opened. Fig. 4 shows a side elevation of the sectional funnel over a mold. Fig. 5 shows a side elevation of the sectional funnel opened, as for removing a mass of glass which has choked it. Fig. 6 shows a side elevation of a funnel having a modified interior shape. Fig. 7 shows an enlarged section on line 7—7 on Fig. 6. Fig. 8 shows an enlarged section on line 8—8 on Fig. 6. Fig. 9 shows a section on line 9—9 of the trough shown in Fig. 6. Fig. 10 shows an enlarged section taken on line 10—10 on Fig. 2.

In the views a portion of the table 12 of a glass pressing or blowing machine is represented as mounted to turn on the shaft 13 and as carrying a mold 14. Above the mold is the delivery end 15 of a trough or conduit for conducting the glass gathers from a source of supply. An arm 16 is fastened to the shaft 13, and mounted on the outer end of this arm over the mold is the curved funnel 17. The opening 18 from the bottom of the funnel is slightly smaller than but is substantially the same in cross sectional shape as the mouth opening 19 of the mold, and the funnel is located so that the axis of its discharge opening is in line with the axis of the mouth opening of the mold, which in the case illustrated is vertical. The funnel is curved in such a manner that its upper end is in position to receive gathers of glass that slide from the end of the trough 15, and the receiving opening 20 is enlarged so as to receive the glass as it is delivered from the trough.

The gathers of molten glass 21 which have substantially the cross sectional shape shown in Fig. 9 slide from the trough down which they come impelled by gravity into the mouth of the funnel, and as they pass through the funnel the gathers are changed in cross sectional shape to approximately that of the molds into which they are to be dropped, but they are elongated and reduced in diameter so that they will drop vertically from the end of the funnel, as shown in Fig. 2, to the bottom of the molds, as shown in Fig. 4. When shaped and delivered in this manner there will be a small space 22 (Fig. 10) substantially around the gather, between it and the wall of the mold, through which the air can escape so that the gather will drop freely to the bottom of the mold, without entrapping air to any detrimental extent.

The funnel above described is formed in a single piece of any suitable metal as iron or aluminum, and should a gather of excess size or extremely abnormal shape happen to be fed into it, and sticking therein, fail to drop into the mold, it would be necessary to pick out this large gather through the enlarged opening at the receiving end 20 of the funnel. In order to avoid danger of damaging the funnel and to save time in clearing out a gather stuck therein, the funnel may be made in sections as shown in Figs. 3, 4 and 5. In this case the section 23 may be made integral with the base flange 24 of the funnel, and the section 25 may be hinged to the base by a pin 26. For convenience in opening and closing the hinged section of the funnel it may be provided with a hooked lug 27, and this section may also be provided with a stop lug 28 which engages the base so as to prevent the section from opening too wide. Should a gather 29 (Fig. 5) stick in the funnel the hinged section may be thrown open so that this gather may be easily and quickly removed and then the hinged section may be closed so that the funnel will resume its normal function.

The molds illustrated have mouths that are circular in cross section and the discharge openings of the funnels shown in Figs. 1 and 2 are shown in Fig. 1 as being circular in cross section but a little smaller in diameter than the openings in the molds.

In sliding along some troughs or conduits the gathers do not keep a circular form, but are apt to be flattened to an oval cross sectional shape and the trough may be made with a curved bottom in order to retain the gathers more nearly circular in form so that they will pass through the funnel freely. Nevertheless under these conditions the gathers are more or less oval or flattened in cross section. An oval gather which slides through the funnel is converted into a cross section like that of the passage through the funnel. This slightly retards the movement of the gather through the funnel. By making the delivery end of any of the funnel openings 30 oval or elliptical, for use under such circumstances, as shown in Figs. 6 and 7, the oval or misshapen glass gathers 31 are not wholly converted into circular form, thus offering less resistance to the passage of the gather through the funnel. If the gather is shaped to an oval form in the funnel and has its longer diameter slightly shorter than the internal diameter of the mold, and its shorter diameter somewhat less, spaces 32 of sufficient cross sectional area will be left between the gather and the wall of the mold, as shown in Fig. 8, to enable the air in the mold to escape freely along the walls of the mold, as the gather drops down to the bottom of the mold. This allows the gather to drop quickly to the bottom of the mold with a minimum amount of air confined beneath it.

The invention claimed is:

1. In an apparatus for handling gathers of molten glass the combination with a conducting trough and a shaping mold, of a curved inclosing funnel located between the delivery end of the trough and the mouth of the mold for conducting the gathers from the trough to the mold and shaping them while being so conducted.

2. In an apparatus for handling gathers of molten glass the combination with a conducting trough and a shaping mold, of a curved inclosing funnel intermediate the trough and the mold, said funnel having an enlarged entrance opening adjacent to and substantially in line with the delivery end of the trough, and a smaller discharge opening adjacent to and substantially in line with the mouth of the mold.

3. In an apparatus for handling gathers of molten glass the combination with a conducting trough and a shaping mold, of a funnel arranged between the delivery end of the trough and the mouth of the mold, said funnel having a curved passage that is oval in cross section at its discharge end for conducting gathers of glass from the trough to the mold and shaping them while being conducted therethrough.

4. In an apparatus for handling gathers of molten glass the combination with a conducting trough and a shaping mold, of a funnel having a curved passage from the delivery end of the trough to the mouth of the mold, said funnel having its walls formed in sections so that it may be opened to gain access to the passage therethrough.

5. In an apparatus for handling gathers of molten glass the combination with a conducting trough and a shaping mold, of an inclosing funnel located between the delivery end of the trough and the mouth of the mold, the discharge end of the opening through the funnel being oval with its longer diameter slightly less than the diameter of the opening in the mold.

6. In an apparatus for handling gathers of molten glass the combination with a conducting trough and a shaping mold, of an inclosing funnel located between the delivery end of the trough and the mouth of the mold, said funnel having a section that is rigidly fixed in position and a section that is hinged thereto and which may be swung open so as to permit access to the opening through the funnel.

7. In an apparatus for handling gathers of molten glass the combination with an inclined conducting trough and a vertical shaping mold, of an inclosing funnel having a curved passage with an enlarged receiving opening substantially in line with the inclined trough and a smaller discharge opening substantially in line with the vertical mold.

Signed at Hartford, Connecticut, this 6th day of August, 1917.

WILLIAM A. LORENZ.